(12) United States Patent
Tevis et al.

(10) Patent No.: US 12,448,754 B2
(45) Date of Patent: Oct. 21, 2025

(54) LOAD BASED TRACKING ASSIST

(71) Applicant: Caterpillar Inc., Peoria, IL (US)

(72) Inventors: Ethan M. Tevis, Bloomington, IL (US); Michael C. Gentle, Maroa, IL (US)

(73) Assignee: Caterpillar Inc., Peoria, IL (US)

( * ) Notice: Subject to any disclaimer, the term of this patent is extended or adjusted under 35 U.S.C. 154(b) by 193 days.

(21) Appl. No.: 18/355,613

(22) Filed: Jul. 20, 2023

(65) Prior Publication Data

US 2025/0027292 A1    Jan. 23, 2025

(51) Int. Cl.
*E02F 9/20* (2006.01)
*E02F 3/84* (2006.01)
*E02F 9/26* (2006.01)

(52) U.S. Cl.
CPC .......... *E02F 9/2045* (2013.01); *E02F 9/2029* (2013.01); *E02F 9/2037* (2013.01); *E02F 9/26* (2013.01); *E02F 3/841* (2013.01); *E02F 3/844* (2013.01)

(58) Field of Classification Search
CPC ..... E02F 9/2045; E02F 9/2029; E02F 9/2037; E02F 9/26; E02F 9/0841; E02F 3/841; E02F 3/844
See application file for complete search history.

(56) References Cited

U.S. PATENT DOCUMENTS

| | | | |
|---|---|---|---|
| 4,565,257 A * | 1/1986 | Hanson | E02F 9/0841 180/419 |
| 9,227,478 B2 | 1/2016 | Horstman | |
| 10,671,074 B2 | 6/2020 | Hashimoto et al. | |
| 10,753,065 B2 | 8/2020 | Ono | |
| 10,858,806 B2 | 12/2020 | Ferraz, Jr. et al. | |
| 10,858,809 B2 | 12/2020 | Mollick | |
| 2011/0035109 A1* | 2/2011 | Ryerson | B62D 53/045 701/42 |
| 2015/0259883 A1* | 9/2015 | Sharma | E02F 9/0841 701/41 |
| 2019/0301130 A1* | 10/2019 | Benevelli | B62D 12/00 |
| 2021/0002856 A1 | 1/2021 | Harshman | |

(Continued)

OTHER PUBLICATIONS

Akpinarh et al.; Handling Dynamics of Motor Graders; 10th International Automotive Technologies Congress OTEKON 2020 Apr. 9-10, 2020, BURSA (Year: 2020).*

*Primary Examiner* — Michael J Zanelli

(57) ABSTRACT

A system for reverting an actual heading of a mobile construction equipment subject to load from one or more work implements to a desired heading, the mobile construction equipment having a front frame articulatable with respect to a rear frame, the front frame including a steering apparatus, the system including: a rear inertial motion unit disposed on the rear frame, the rear inertial motion unit for providing an actual rear frame yaw rate; a steering sensor for providing an actual steering angle of the steering apparatus; an articulation sensor for providing an actual articulation angle between the front frame and the rear frame; and a controller for: receiving the actual rear frame yaw rate, the actual steering angle, and the actual articulation angle to determine the actual heading, receiving a steering control indicating a desired steering angle of the steering apparatus and an articulation control indicating a desired articulation angle.

20 Claims, 9 Drawing Sheets

(56) References Cited

U.S. PATENT DOCUMENTS

| | | |
|---|---|---|
| 2022/0049473 A1 | 2/2022 | Takaoka |
| 2023/0203779 A1* | 6/2023 | Kamimae ............... E02F 3/765 |
| | | 172/430 |
| 2024/0151001 A1* | 5/2024 | Sonoda ................ E02F 9/0841 |
| 2024/0301657 A1* | 9/2024 | Sonoda .................... E02F 9/20 |

* cited by examiner

LOAD BASED TRACKING ASSIST

FIELD

The present disclosure generally relates to construction equipment, such as a motor grader, and more particularly to systems, methods, and controllers for causing a motor grader to revert to a desired heading if excess load results in a deviation between an actual heading of the motor grader and the desired heading.

BACKGROUND

Construction equipment, such as a motor grader, can be used for road work, ditch work, site preparation, and other surface contouring and finishing tasks. The versatility of a motor grader is provided in large part by the ability to mount one or more ground-engaging work implements to the motor grader.

FIGS. 1-3 are a schematic views of a conventional motor grader 10. As shown, motor grader 10 includes a front frame 12, rear frame 14, and at least one work implement 16, such as main blade assembly 16A. Rear frame 14 includes a power source, contained within a rear compartment 20, that is operatively coupled through a transmission to rear traction devices or wheels 22 for primary machine propulsion. The power source may be, for example, a diesel engine, a gasoline engine, a natural gas engine, or any other engine. The power source may also be an electric motor linked to a fuel cell, capacitive storage device, battery, or another source of power. Rear wheels 22 are operatively supported on tandem axles 24, which are pivotally connected to motor grader 10 between rear wheels 22 on each side of motor grader 10. The transmission may be a mechanical transmission, hydraulic transmission, or any other transmission type. The transmission may be operable to produce multiple output speed ratios (or a continuously variable speed ratio) between the power source and driven traction devices.

Motor grader steering is generally accomplished through a combination of both front wheel steering and machine articulation (i.e., an articulation of front frame 12 with respect to rear frame 14). As shown in FIG. 2, steerable traction devices, such as right and left wheels 58, 60, are associated with a beam 28 of front frame 12. Wheels 58, 60 may be both rotatable and tiltable for use during steering and leveling of a work surface 86. Front wheels 58, 60 are connected via a steering apparatus 88 that may include a linkage 90 and a hydraulic cylinder for rotation about front wheel pivot points 80 (e.g., as shown in FIG. 3), and tilt cylinders 92 for front wheel tilt. Front steerable wheels 58, 60 and/or rear driven traction devices 22 may include tracks, belts, or other traction devices as an alternative to wheels. Front wheels 58, 60 may also be driven, as is the case in motor graders provided with all-wheel drive. For example, the power source may be operatively connected to a hydraulic pump fluidly coupled to one or more hydraulic motors associated with front wheels 58, 60.

As shown in FIG. 3, an actual steering angle $\theta_{AS}$ of front wheels 58, 60 is defined between a longitudinal axis 76 parallel to longitudinal axis 48 of front frame 12 and a longitudinal axis 78 of front wheels 58, 60, the actual steering angle $\theta_{AS}$ having an origin at pivot point 80 of front wheels 58, 60. Actual steering angle $\theta_{AS}$ is demonstrated in connection with left front wheel 60, but could be based upon either a steering angle for right front wheel 58 or left front wheel 60. Alternatively, a centerline steering angle may be calculated that is an average of right and left steering angles in the event that some variation or error exists based upon, for example, wheel misalignment or sensor errors.

Motor grader 10 also includes an articulation joint 62 that pivotally connects front frame 12 and rear frame 14. Both a right articulation actuator 64 and left articulation actuator 66 are connected between front frame 12 and rear frame 14 on opposing sides of motor grader 10, as shown in FIG. 3. Right and left articulation actuators 64, 66 are used to pivot front frame 12 relative to rear frame 14 about an articulation axis B.

FIG. 3, which is a schematic top view of motor grader 10, shows that front frame 12 is rotated at an actual articulation angle $+\alpha_A$ defined by the intersection of longitudinal axis 48 of front frame 12 and longitudinal axis 68 of the rear frame 14, the intersection corresponding with the position of articulation joint 62. In this illustration, a positive actual articulation angle $\alpha_A$ is indicative of a left articulation from the perspective of a motor grader operator facing forward, while a negative actual articulation angle $\alpha_A$ would be indicative of a right articulation. In FIG. 2, in contrast, motor grader 10 is positioned in the neutral or zero actual articulation angle $\alpha_A$ position, wherein longitudinal axis 48 of front frame 12 is aligned with longitudinal axis 68 of rear frame 14.

Returning to FIGS. 1-2, front frame 12 typically supports an operator station 26 that contains operator controls, along with a variety of displays or indicators, such as user interface 27, for conveying information to the operator for primary operation of motor grader 10 or receiving input from the operator. Operator station 26 may also include one or more steering controls 106 (e.g., for steering front wheels 58, 60 via steering apparatus 88). Steering controls 106 may be, for example, a steering wheel 106 or any other type of operator input device, such as a dial, joystick, keyboard, pedal, or other devices. Operator station 26 also includes one or more articulation controls 116 (e.g., for controlling right and left articulation actuators 64, 66). Articulation controls 116 could also be any type of operator input device, such as a dial, joystick, keyboard, pedal, or other device.

Motor grader 10 may also work in conjunction with a global navigation satellite system, or GNSS. A GNSS is a satellite navigation system with global coverage that can be used to provide autonomous geo-positioning of objects associated with the GNSS, such as an autonomously operated motor grader. One example of a GNSS is a global positioning system, or GPS. The GNSS may include a satellite positioning unit 134 disposed on motor grader 10. Satellite positioning unit 134 generates signals indicative of a location of motor grader 10. Satellite positioning unit 134 may determine and generate signals corresponding to the latitude and/or longitude of motor grader 10. Satellite positioning unit 134 may be disposed on a top portion of motor grader 10 (e.g., on operator station 26, as shown in FIG. 1), to communicate with a number of satellites of the GNSS and to receive signals indicative of a location of motor grader 10, although satellite positioning unit 134 may be disposed elsewhere on motor grader 10.

Beam 28 of front frame 12 may support one or more work implements 16, such as main blade assembly 16A, which is employed to move blade 30 thereof to a wide range of positions relative to motor grader 10. Main blade assembly 16A is one example of a work implement 16 that can produce a load L on motor grader 10. Other work implements 16 can include front blade assembly 16B (as shown in FIG. 6), rippers, snow wings, scarifiers, etc.

Main blade assembly 16A includes a drawbar 32 pivotally mounted to a first end 34 of beam 28 via a ball joint or the like. The position of drawbar 32 is typically controlled by hydraulic cylinders: a right lift cylinder 36 and left lift cylinder 38, as shown in FIG. 2, that control vertical movement, and a center shift cylinder 40, as shown in FIG. 1, that controls horizontal movement. Right and left lift cylinders 36, 38 are connected to a coupling 70 that includes lift arms 72 pivotally connected to beam 28 for rotation about axis C. A bottom portion of coupling 70 may have an adjustable length horizontal member 74 that is connected to center shift cylinder 40.

Drawbar 32 may include a large, flat plate, commonly referred to as a yoke plate 42. Beneath yoke plate 42 is a circular gear arrangement and mount, commonly referred to as a circle 44. Circle 44 is rotated by, for example, a hydraulic motor referred to as a circle drive 46. Rotation of circle 44 by circle drive 46 rotates attached blade 30 about an axis A perpendicular to a plane of drawbar yoke plate 42.

Blade 30 is also mounted to circle 44 via a pivot assembly 50 that allows for tilting of blade 30 relative to circle 44. A blade tip cylinder 52 is used to tilt blade 30 forward or rearward. In other words, blade tip cylinder 52 is used to tip or tilt a top edge 54 of blade 30 relative to a bottom cutting edge 56 of blade 30, which is commonly referred to as a blade tip. Blade 30 is also mounted to a sliding joint associated with circle 44 that allows blade 30 to slide or shift from side-to-side relative to circle 44. The side-to-side shift is commonly referred to as blade side shift. A side shift cylinder or the like is used to control the blade side shift.

The foregoing components allow for movement of blade 30 in a number of different manners. To determine a position of blade 30, motor grader 10 can include, for example, mainfall sensor 136, rotation sensor 138, and blade slope sensor 140, as shown in FIG. 4. These sensors may be used to measure the mainfall or pitch of motor grader 10, the blade slope of blade 30, and the circle rotation angle of circle 44, respectively.

Mainfall sensor 136 may be a single multi-axis inertial measurement unit ("IMU") configured to produce a signal indicative of the longitudinal pitch of motor grader 10 and a signal indicative of the lateral roll of motor grader 10. IMUs are self-contained sensor systems capable of generating signals indicative of linear and angular motion. A multi-axis IMU includes two or more gyroscopes and accelerometers for measuring linear and angular motion in at least two dimensions (e.g., along two axes). The axes of the multi-axis IMU are typically aligned with the longitudinal axis of motor grader 10 (e.g., longitudinal axis 48 of front frame 12) and the lateral axis of motor grader 10 to generate signals indicative of the longitudinal pitch and lateral roll of motor grader 10, respectively.

Rotation sensor 138 may be configured to produce a signal indicative of the angle of blade 30 relative to front frame 12 and the lateral axis of motor grader 10. Rotation sensor 138 produces a signal indicative of the direction of blade 30 relative to the direction of travel of motor grader 10.

Blade slope sensor 140 may be configured to produce a signal indicative lateral slope of blade 30. The axis of mainfall sensor 136 is aligned with the longitudinal axis of motor grader 10 (e.g., longitudinal axis 48 of front frame 12) to generate signals indicative of the longitudinal pitch of motor grader 10, while blade slope sensor 140 generates signals indicative of the lateral roll of motor grader 10 when blade 30 is aligned with a lateral axis of motor grader 10.

Rotation sensor 138 can be used in conjunction with blade slope sensor 140 to determine the lateral roll of motor grader 10 when blade 30 is aligned with the lateral axis of motor grader 10, ensuring the signals from blade slope sensor 140 are measuring the slope of a surface that is perpendicular to the direction of travel of motor grader 10.

FIG. 5 shows a block diagram of a conventional steering control system 100 for motor grader 10. Steering control system 100 generally includes a controller 102 configured, for example, via a control algorithm, to receive a plurality of signals from various sensors and/or operator commands, and to responsively control various machine actuators and/or communicate with the machine operator. Controller 102 may include various components for executing software instructions designed to regulate subsystems of motor grader 10. For example, controller 102 may include a central processing unit (CPU), a random access memory (RAM), a read-only memory (ROM), input/output elements, etc. Controller 102 may execute machine readable instructions stored in controller 102 on a mass storage device, RAM, ROM, local memory, and/or on a removable storage medium, such as a CD, DVD, and/or flash memory device.

Steering control system 100 may control articulation of motor grader 10 based upon control of front wheel steering of motor grader 10, or independently of front wheel steering of motor grader 10. For example, motor grader 10 may include one or more steering sensors 104 associated with one or both of right and left front wheels 58, 60 and/or steering apparatus 88 to provide actual steering angle $\theta_{AS}$ to controller 102. Steering sensors 104 can monitor angles of rotation of steering linkages 90 and/or pivot points 80 at front wheels 58, 60. Steering sensors 104 can instead measure an extension amount of an actuator, such as a hydraulic actuator, that controls the steering of front wheels 58, 60. In this manner, steering sensors 104 may provide data "indicative of" actual steering angle $\theta_{AS}$, including direct measurements of the quantity or characteristic of interest, as well as indirect measurements, such as a different quantity or characteristic having known relationships with the quantity or characteristic of interest. Steering sensors 104 could be any type of sensor, including, for example, potentiometers, extension sensors, proximity sensors, angle sensors, and the like.

Controller 102 also receives a signal from one or more steering controls 106 indicative of a desired steering angle $\theta_{DS}$ of motor grader 10. Steering controls 106 may be, for example, steering wheel 106 shown in FIGS. 1-2.

One or more articulation sensors 108 may provide to controller 102 an indication of an actual articulation angle $\alpha_A$ between rear frame 14 and front frame 12 at axis B. Articulation sensor 108 is typically a pivot sensor disposed at articulation joint 62 to sense rotation at articulation axis B. Articulation sensor 108 may monitor the extension of right and/or left articulation actuators 64, 66. Articulation sensors 108 could be any type of sensor, including, for example, potentiometers, extension sensors, proximity sensors, angle sensors, and the like.

Controller 102 also receives a signal from one or more articulation controls 116 indicative of a desired articulation angle $\alpha_D$ between front frame 12 and rear frame 14 of motor grader 10. Articulation controls 116 may be, for example, articulation controls 116 shown in FIGS. 1-2.

Other inputs that may be associated with steering control system 100 may include one or more machine speed sensors 112, which could be any sensor configured to monitor an actual machine speed, or linear velocity, $V_A$, of motor grader 10, including sensors associated with any of the front wheels 58, 60, rear wheels, tandem axles 24, motors, or other components of the drivetrain of motor grader 10.

During standard machine operations, the operator may manually operate both steering controls 106 and articulation controls 116 to maneuver motor grader 10. For example, steering controls 106 can provide desired steering angle $\theta_{DS}$ to controller 102, which responsively controls steering apparatus 88. Similarly, articulation controls 116 can provide desired articulation angle $\alpha_D$ to controller 102, which responsively controls articulation actuators 64, 66. Such controls may be, for example, pilot or electro-hydraulic signals that control operation of one or more pumps, motors, or valves of a hydraulic system that operates steering apparatus 88 and/or articulation actuators 64, 66.

Desired steering angle $\theta_{DS}$ and desired articulation angle $\alpha_D$ together result in a desired heading $H_D$ of motor grader 10, as shown in FIG. 6. In some instances, however, motor grader 10 is fitted with one or more work implements 16, such as main blade assembly 16A, front blade assembly 16B, etc., each of which can produce its own load L (e.g., load $L_{16A}$, load $L_{16B}$, respectively) on motor grader 10, such as when work implement 16 is engaged with work surface 86. Either individually or collectively, the resulting load L on motor grader 10 may be sufficient to cause motor grader 10 to deviate from desired heading $H_D$ to actual heading $H_A$, taking motor grader 10 off course. Such a deviation may result in lost productivity, repeating previous work, or even motor grader 10 becoming stuck with respect to work surface 86. There is therefore a need to improve steering of motor grader 10 when motor grader 10 is subjected to a significant load L from one or more work implements 16.

SUMMARY

One aspect of the present disclosure is directed to a system for reverting an actual heading of a mobile construction equipment subject to load from one or more work implements to a desired heading, the mobile construction equipment having a front frame articulatable with respect to a rear frame, the front frame including a steering apparatus, the system comprising: a rear inertial motion unit disposed on the rear frame, the rear inertial motion unit being configured to provide an actual rear frame yaw rate; a steering sensor configured to provide an actual steering angle of the steering apparatus; an articulation sensor configured to provide an actual articulation angle between the front frame and the rear frame; and a controller configured to: receive the actual rear frame yaw rate, the actual steering angle, and the actual articulation angle to determine the actual heading, receive a steering control indicating a desired steering angle of the steering apparatus and an articulation control indicating a desired articulation angle between the front frame and the rear frame, determine, based on the desired steering angle and the desired articulation angle, a desired rear frame yaw rate, determine the desired heading based on the desired steering angle, the desired articulation angle, and the desired rear frame yaw rate, determine a heading difference between the actual heading and the desired heading, and based on the heading difference exceeding a threshold, at least one of: adjust the steering control, adjust the articulation control, perform removal of load from the mobile construction equipment, or provide an indication to an operator of the mobile construction equipment.

Another aspect of the present disclosure is directed to a method for reverting an actual heading of a mobile construction equipment subject to load from one or more work implements to a desired heading, the mobile construction equipment having a front frame articulatable with respect to a rear frame, the front frame including a steering apparatus, the method comprising: receiving an actual rear frame yaw rate from a rear inertial motion unit disposed on the rear frame; receiving an actual steering angle of the steering apparatus; receiving an actual articulation angle between the front frame and the rear frame; determining the actual heading based on the actual rear frame yaw rate, the actual steering angle, and the actual articulation angle; receiving a steering control indicating a desired steering angle of the steering apparatus; receiving an articulation control indicating a desired articulation angle between the front frame and the rear frame; determining, based on the desired steering angle and the desired articulation angle, a desired rear frame yaw rate; determining the desired heading based on the desired steering angle, the desired articulation angle, and the desired rear frame yaw rate; determining a heading difference between the actual heading and the desired heading; and based on the heading difference exceeding a threshold, at least one of: adjusting the steering control, adjusting the articulation control, performing removal of load from the mobile construction equipment, or providing an indication to an operator of the mobile construction equipment.

A further aspect of the present disclosure is directed to a controller for reverting an actual heading of a mobile construction equipment subject to load from one or more work implements to a desired heading, the mobile construction equipment having a front frame articulatable with respect to a rear frame, the front frame including a steering apparatus, the controller being configured to: receive an actual rear frame yaw rate from a rear inertial motion unit disposed on the rear frame; receive an actual steering angle of the steering apparatus; receive an actual articulation angle between the front frame and the rear frame; determine the actual heading based on the actual rear frame yaw rate, the actual steering angle, and the actual articulation angle; receive a steering control indicating a desired steering angle of the steering apparatus; receive an articulation control indicating a desired articulation angle between the front frame and the rear frame; determine, based on the desired steering angle and the desired articulation angle, a desired rear frame yaw rate; determine the desired heading based on the desired steering angle, the desired articulation angle, and the desired rear frame yaw rate; determine a heading difference between the actual heading and the desired heading; and based on the heading difference exceeding a threshold, at least one of: adjust the steering control, adjust the articulation control, perform removal of load from the mobile construction equipment, or provide an indication to an operator of the mobile construction equipment.

DETAILED DESCRIPTION

Figure 1:
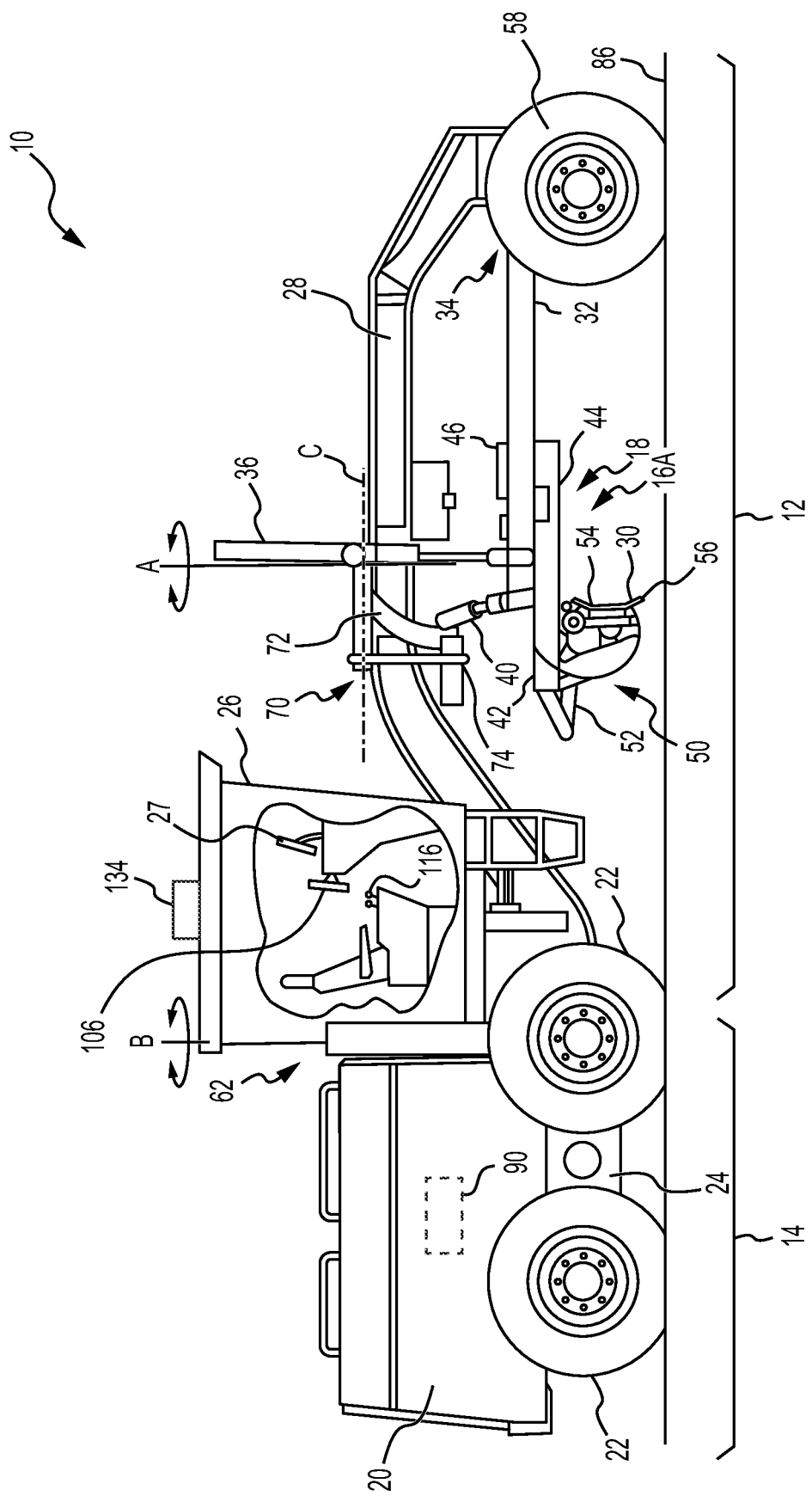
FIG. 1 is a side view of a conventional motor grader.
Figure 2:
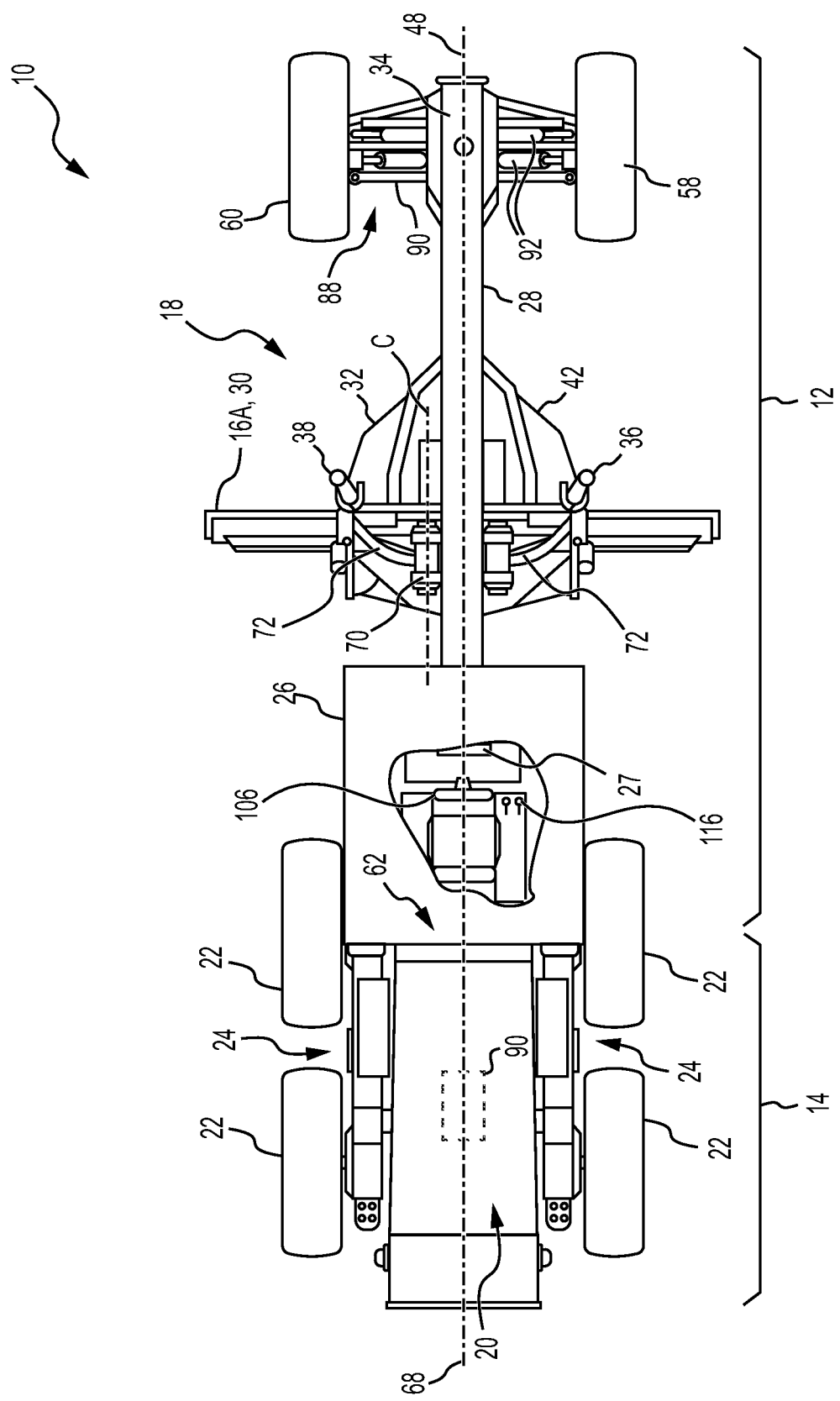
FIG. 2 is a top view of the motor grader of FIG. 1.
Figure 3:
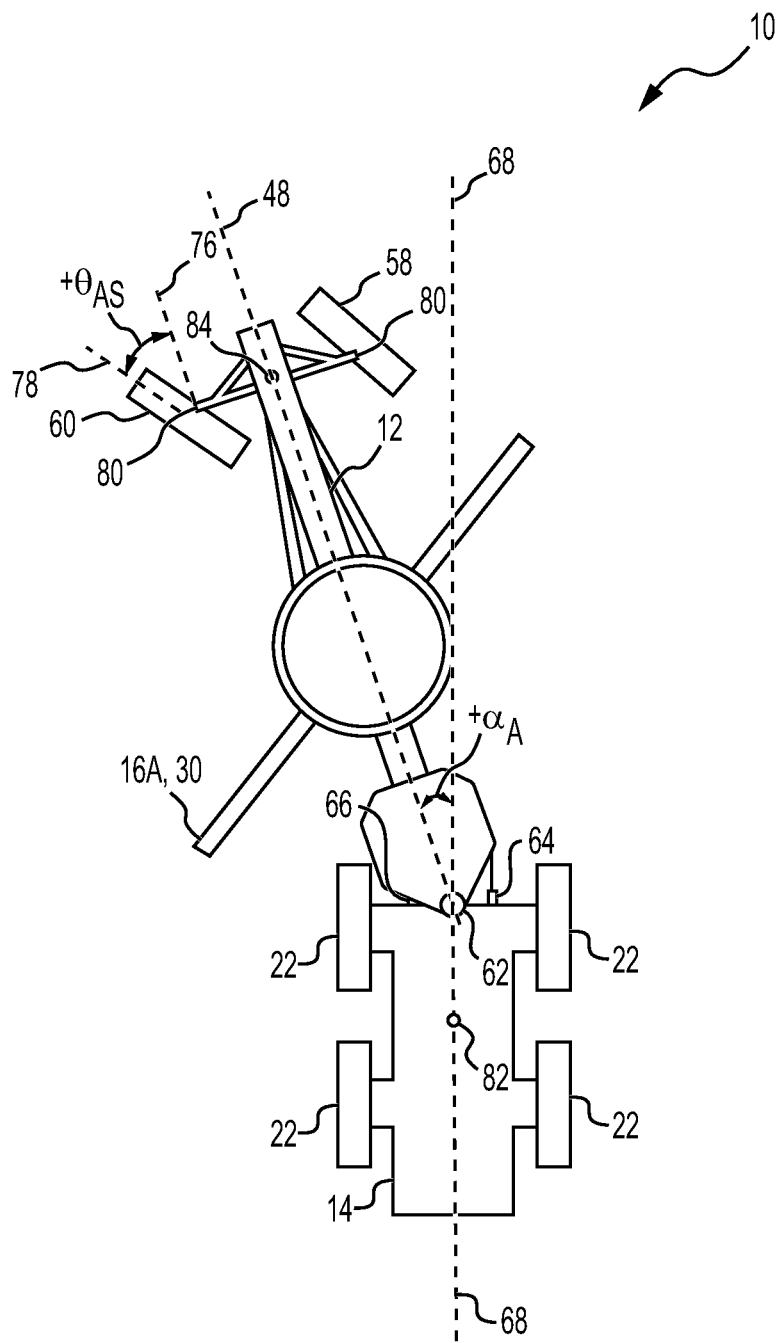
FIG. 3 is a schematic top view of the motor grader of FIGS. 1-2 showing articulation of a front frame of the motor grader with respect to a rear frame of the motor grader.
Figure 4:
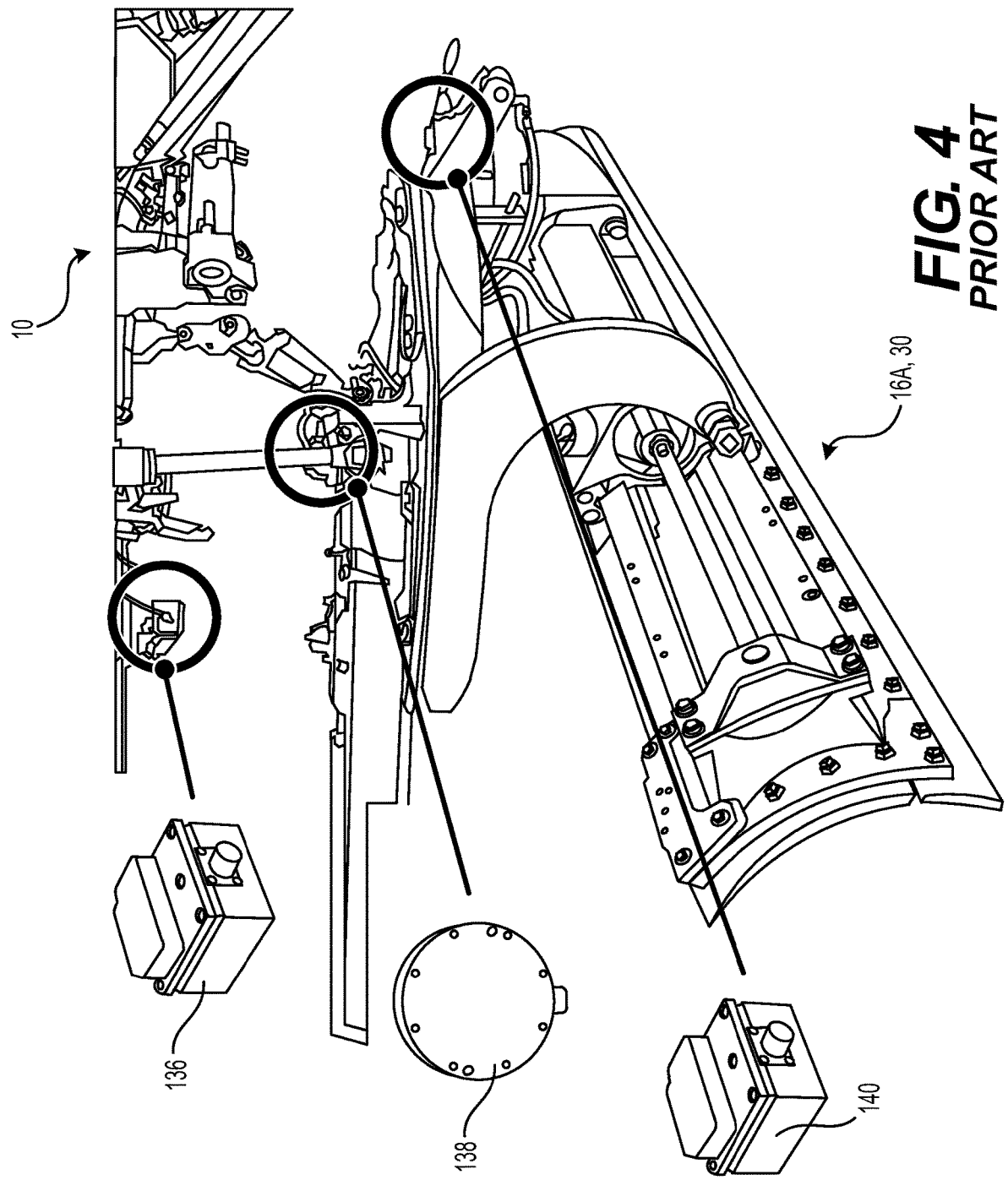
FIG. 4 is a detail view showing an exemplary work implement of the motor grader of FIGS. 1-3.

The present application describes systems, methods, and controllers for reverting an actual heading $H_A$ of a mobile construction equipment, such as motor grader 10, subject to a load L, to a desired heading $H_D$, in part by using one or more IMUs.

As discussed above in the context of mainfall sensor 136, an IMU is a measuring device that may include a number of sensors. The sensors may include accelerometers and/or gyroscopes. The sensors may generate signals indicative of various positional attributes of the object to which the IMU is attached, such as a change in the velocity of the object, a change in the attitude/orientation of the object, and a change in the path of travel of the object. The IMU determines the acceleration of the object based on the signals generated by the sensors of the IMU.

In some instances, the IMU also determines changes in rotational attributes of the object, such as, pitch, roll, and yaw. In the context of motor grader 10, the pitch describes rotation about an axis running from the left of the motor grader to the right of motor grader 10, roll describes rotation about an axis running from the front of motor grader 10 to the rear of motor grader 10 (e.g., collinear axes 48 and 68 extending between front frame 12 and rear frame 14), and yaw describes rotation about an axis that runs vertically through motor grader 10, similar to articulation axis B. The yaw rate, in turn, is the rate of change of the yaw over time, and provides an indication of how quickly the component of motor grader 10 to which the IMU is attached is turning (e.g., to the left or to the right from the perspective of motor grader 10).

Figure 7:
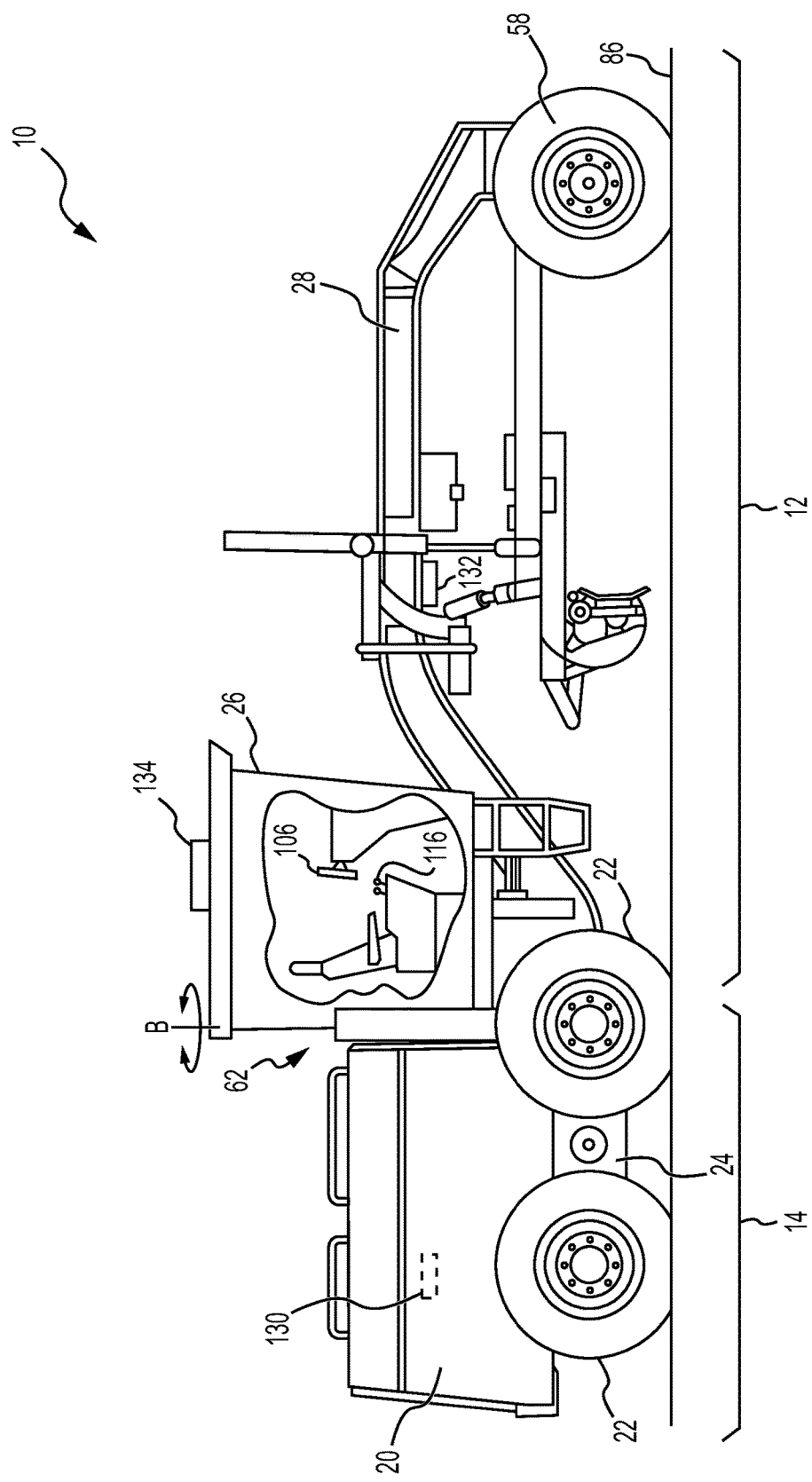
FIG. 7 shows a motor grader according to the present disclosure.

FIG. 7 shows a motor grader 10 that is identical to conventional motor grader 10 shown in FIGS. 1-4, but has a number of additional components, including rear IMU 130 mounted to rear frame 14 of motor grader 10 (e.g., in rear compartment 20) and, optionally, front IMU 132 mounted to front frame 12 of motor grader 10 (e.g., on beam 28). Rear IMU 130 and front IMU 132 may also be disposed elsewhere on rear frame 14 and front frame 12, respectively, than where shown in FIG. 7. However, given the articulation of front frame 12 with respect to rear frame 14 about articulation joint 62, it is preferable to have one IMU disposed on front frame 12 and another IMU disposed on rear frame 14.

Figure 5:
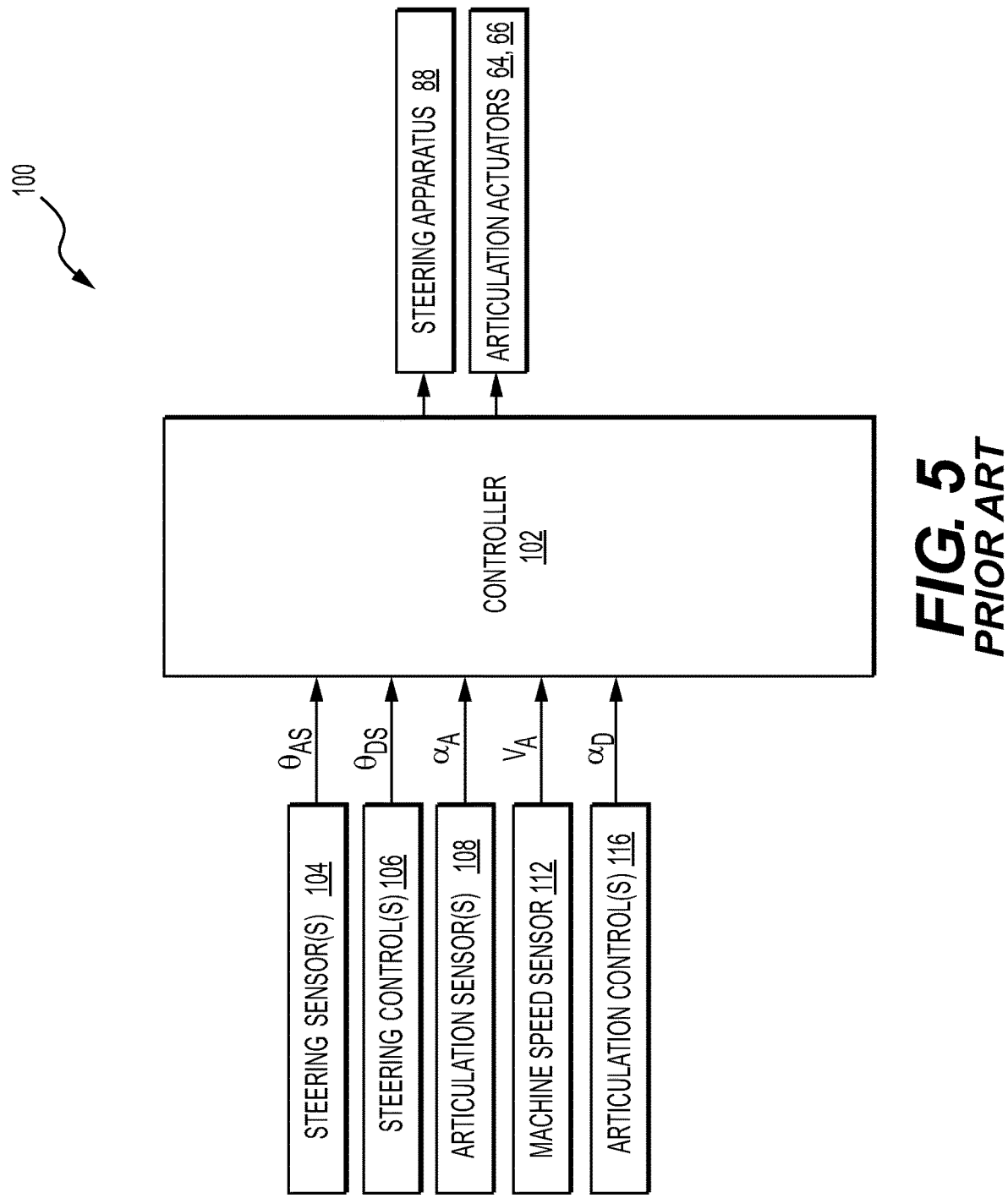
FIG. 5 shows a conventional steering control system for the motor grader of FIGS. 1-4.
Figure 8:
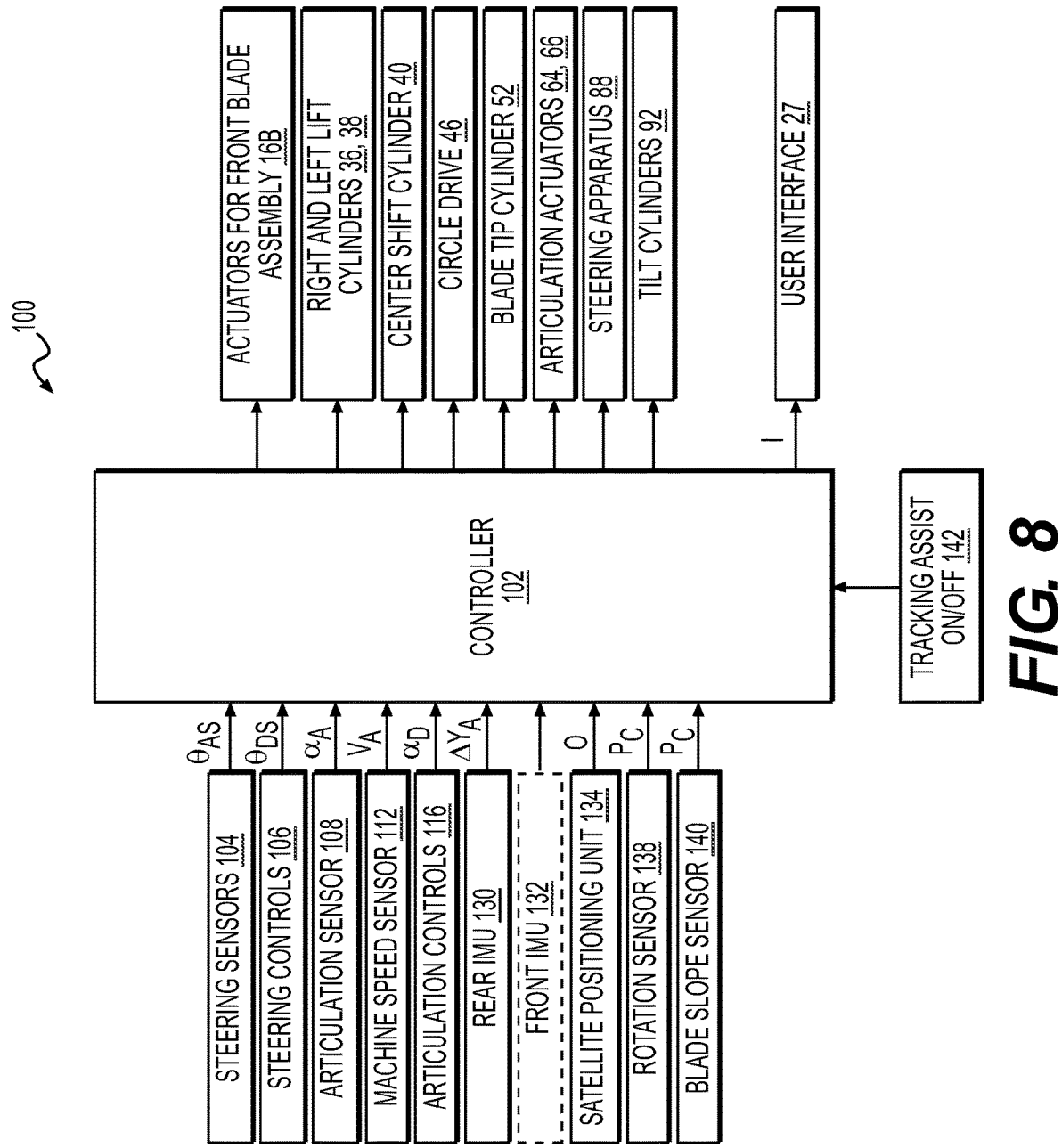
FIG. 8 shows a steering control system for a motor grader according to the present disclosure.

FIG. 8 shows a controller 102 for use with motor grader 10 of FIG. 7 that is similar to controller 102 described in the context of FIG. 5, but incorporates a number of different inputs and produces a number of different outputs. Specifically, rear IMU 130 provides controller 102 with a number of inputs associated with rear frame 14. Those inputs could include positional, acceleration, and rotational attributes of rear frame 14. As one example, rear IMU 130 can provide controller 102 with the actual rear frame yaw rate $\Delta Y_A$ of rear frame 14. Front IMU 132 provides the same inputs to controller 102 as rear IMU 130, but with respect to front frame 12 rather than rear frame 14.

As shown in FIG. 8, controller 102 also receives actual steering angle $\theta_{AS}$ from steering sensor 104 and actual articulation angle $\alpha_A$ from articulation sensor 108. Upon receipt of actual rear frame yaw rate $\Delta Y_A$ from rear IMU 130, actual steering angle $\theta_{AS}$, and actual articulation angle $\alpha_A$, controller 102 determines actual heading $H_A$ of motor grader 10, which is indicative of where motor grader 10 is actually heading as opposed to where the operator of motor grader 10 (who is located either in operator station 26 or remotely from motor grader 10, if motor grader 10 is being autonomously operated) wants motor grader 10 to head.

Controller 102 also receives information related to a desired heading $H_D$, which is indicative of a direction in which the operator of motor grader 10 wants motor grader 10 to head. In particular, controller 102 receives a steering control (e.g., input from steering control 106) indicative of a desired steering angle $\theta_{DS}$ of motor grader 10 (e.g., of steering apparatus 88). Controller 102 also receives an articulation control (e.g., input from articulation control 116) indicative of a desired articulation angle $\alpha_D$ between front frame 12 and rear frame 14. Together, desired steering angle $\theta_{DS}$ and desired articulation angle $\alpha_D$ are generally indicative of where the operator wants motor grader 10 to head. In some instances, in addition to desired steering angle $\theta_{DS}$ and desired articulation angle $\alpha_D$, the operator can also provide to controller 102 a wheel lean control indicative of a desired wheel lean of front wheels 58, 60, which helps to further dictate the desired direction of motor grader 10. Controller 102 can effectuate the wheel lean control by controlling, for example, tilt cylinders 92.

Once controller 102 receives desired steering angle $\theta_{DS}$ and desired articulation angle $\alpha_D$, controller 102 can determine a desired rear frame yaw rate $\Delta Y_D$. The desired rear frame yaw rate $\Delta Y_D$, in turn, can be used, along with desired steering angle $\theta_{DS}$ and desired articulation angle $\alpha_D$, to determine desired heading $H_D$ of motor grader 10.

Controller 102 then compares desired heading $H_D$ with actual heading $H_A$. The result of this comparison is a heading difference $D_H$. For example, controller 102 can determine heading difference $D_H$ by determining differences between actual rear frame yaw rate $\Delta Y_A$ and desired rear frame yaw rate $\Delta Y_D$, actual steering angle $\theta_{AS}$ and desired steering angle $\theta_{DS}$, and actual articulation angle $\alpha_A$ and desired articulation angle $\alpha_D$.

If controller 102 determines that heading difference $D_H$ exceeds a threshold T, which is adjustable (e.g., by the operator of motor grader 10). Heading difference $D_H$ exceeding threshold T is indicative of actual heading $H_A$ deviating from desired heading $H_D$ by a certain amount. If this scenario occurs, controller 102 can implement one or more actions that will cause heading difference $D_H$ to become smaller, such that it instead meets or falls below threshold T, or even reaches zero, which would indicate that actual heading $H_A$ and desired heading $H_D$ are the same.

For example, if heading difference $D_H$ exceeds threshold T, controller 102 can adjust steering control 106 such that steering apparatus 88 steers front wheels 58, 60 to cause actual steering angle $\theta_{AS}$ to become closer to desired steering angle $\theta_{DS}$. Doing so brings actual heading $H_A$ closer to desired heading $H_D$ (i.e., such that heading difference $D_H$ instead meets or falls below threshold T).

Either alternatively or in addition to controller 102 adjusting steering control 106, controller 102 can adjust articulation control 116 such that one or both of articulation actuators 64, 66 cause actual articulation angle $\alpha_A$ to become closer to desired articulation angle $\alpha_D$. Doing so brings actual heading $H_A$ closer to desired heading $H_D$ (i.e., such that heading difference $D_H$ instead meets or falls below threshold T).

Either alternatively or in addition to controller 102 adjusting steering control 106 and/or articulation control 116, controller 102 can perform removal of load L from motor grader 10. For example, if main blade assembly 16A is engaged with work surface 86, there is a resulting load $L_{16A}$ from main blade assembly 16A on motor grader 10 that may be significant enough to cause heading difference $D_H$ to exceed threshold T, indicating that actual heading $H_A$ has deviated significantly from desired heading $H_D$. To bring actual heading $H_A$ closer to desired heading $H_D$, controller 102 can instruct actuators associated with a particular load L (e.g., right and left lift cylinder 36, 38, center shift cylinder 40, circle drive 46, blade tip cylinder 52, etc., in the context of load $L_{16A}$ from main blade assembly 16A) to act in a way that reduces load L. For example, if load $L_{16A}$ from main blade assembly 16A is causing actual heading $H_A$ to deviate from desired heading $H_D$ such that heading difference $D_H$ exceeds threshold T, controller 102 can instruct right and left lift cylinder 36, 38 to actuate, causing blade 30 of main blade assembly 16A to begin to lift and at least partially disengage from work surface 86. As a result, load $L_{16A}$ from main blade assembly 16A decreases, bringing actual heading $H_A$ closer to desired heading $H_D$ (i.e., such that heading difference $D_H$ instead meets or falls below threshold T).

In the context of the present application, at least partial disengagement of one or more work implements 16 from work surface 86 could represent one or more things. For example, as discussed in the preceding paragraph, partial disengagement from work surface 86 occurs when blade 30 of main blade assembly 16A begins to lift off work surface 86. As another example, partial disengagement could occur by rotating circle 44 using circle drive 46 to cause rotation of blade 30 about axis A, such that material on work surface 86 (e.g., dirt) discharges from a trailing edge of blade 30 more easily. As yet another example, partial disengagement could occur by actuating blade tip cylinder 52 so as to tip or tilt top edge 54 of blade 30 relative to bottom cutting edge 56 of blade 30 so that material on work surface 86 (e.g., dirt) flows more easily from blade 30. In each case, however, partial disengagement results in load $L_{16}$ from work implement 16 decreasing, bringing actual heading $H_A$ closer to desired heading $H_D$ (i.e., such that heading difference $D_H$ instead meets or falls below threshold T). Other means of partial disengagement are known in the art and are equally applicable in the context of the present application.

Figure 6:
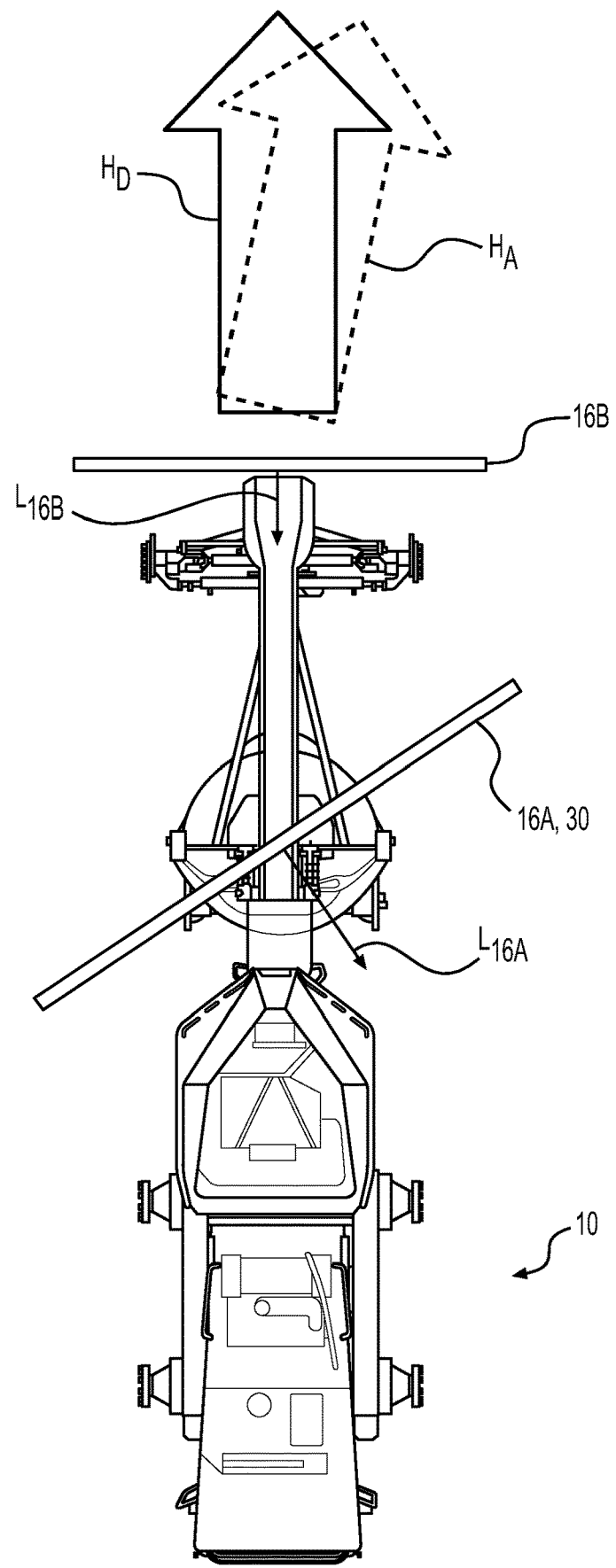
FIG. 6 shows the motor grader of FIGS. 1-4 deviating from a desired heading to an actual heading.

Although the removal of load L is discussed in the context of load $L_{16A}$ from main blade assembly 16A, the concepts discussed herein are equally applicable to loads L associated with any and all other work implements 16 mounted on motor grader 10, including front blade assembly 16B, rippers, snow wings, scarifiers, etc. For example, in the context of front blade assembly 16B, which is shown in FIG. 6, if front blade assembly 16B is engaged with work surface 86, there is a resulting load $L_{16B}$ from front blade assembly 16B on motor grader 10. Load $L_{16B}$ may be significant enough to cause heading difference $D_H$ to exceed threshold T, indicating that actual heading $H_A$ has deviated significantly from desired heading $H_D$. Controller 102 can therefore instruct actuators for front blade assembly 16B to actuate, as shown in FIG. 8, causing front blade assembly 16B to at least partially disengage from work surface 86. As a result, load $L_{16B}$ from front blade assembly 16B decreases, bringing actual heading $H_A$ closer to desired heading $H_D$ (i.e., such that heading difference $D_H$ instead meets or falls below threshold T).

In the event that a plurality of work implements 16 of motor grader 10 are each engaged with work surface 86 resulting in an overall load L that causes heading difference $D_H$ to exceed threshold T, controller 102 can selectively perform removal of one or more of the loads (e.g., load $L_{16A}$, load $L_{16B}$, etc.) making up overall load L to bring actual heading $H_A$ closer to desired heading $H_D$.

Either alternatively or in addition to controller 102 adjusting steering control 106 and/or articulation control 116 and/or performing removal of load L from motor grader 10, controller 102 can provide an indication I to the operator of motor grader 10 (e.g., on user interface 27) indicating that heading difference $D_H$ exceeds threshold T and/or that actual heading $H_A$ has deviated significantly from desired heading $H_D$. Based on indication I, the operator can determine what, if any, corrective action to take to cause heading difference $D_H$ to meet or fall below threshold T such that actual heading $H_A$ is closer to desired heading $H_D$.

Either alternatively or in addition to controller 102 adjusting steering control 106 and/or articulation control 116 and/or performing removal of load L from motor grader 10 and/or providing indication I to the operator of motor grader 10, controller 102 can lower actual machine speed $V_A$ if heading difference $D_H$ exceeds threshold T. For example, controller 102 could cause rear traction devices or wheels 22 to slow down to the point that heading difference $D_H$ meets or falls below threshold T, reducing load L on motor grader 10 and bringing actual heading $H_A$ closer to desired heading $H_D$.

Controller 102 can receive configuration parameters $P_C$ that indicate whether a corresponding work implement 16 is engaged with work surface 86 such that the particular work implement 16 imparts a load L on motor grader 10. Configuration parameters $P_C$ are outputs from one or more sensors associated with work implements 16. For example, in the context of main blade assembly 16A, configuration parameters $P_C$ would include outputs from blade slope sensor 136, blade slope sensor 138, etc., as shown in FIG. 8.

Controller 102 can also use configuration parameters $P_C$ to determine a corresponding load L associated with each work implement 16 with which particular configuration parameters $P_C$ are associated. When each load L associated with a particular work implement is known (i.e., based on configuration parameters $P_C$), controller 102 can use that information to selectively perform removal of one or more of the loads (e.g., load $L_{16A}$, load $L_{16B}$, etc.) making up overall load L on motor grader 10 to bring actual heading $H_A$ closer to desired heading $H_D$. Specifically, controller 102 can instruct actuators associated with one or more of the particular work implements 16 contributing to overall load L to at least partially disengage from work surface 86, thereby lowering overall load L, causing heading difference $D_H$ to meet or fall below threshold T.

Satellite positioning unit 134 can also provide output O, such as heading information and/or actual machine speed $V_A$, to controller 102. In particular, controller 102 can compare output O to actual heading $H_A$ and/or desired heading $H_D$ and, optionally, modify actual heading $H_A$ and/or desired heading $H_D$ based on the comparison (e.g., to correct bias that may be inherent in actual heading $H_A$ and/or desired heading $H_D$). Such modification may be based, for example, on consideration of the location of motor grader 10 with respect to known roadways and/or obstacles (e.g., bridges, intersections, rail crossings, cattle guards, etc.).

Steering control system 100 also includes a switch 142 to turn on or off load based tracking assist. For example, an operator of motor grader 10 could actuate switch 142, and turn on load based tracking assist, if the operator prioritizes bringing actual heading $H_A$ closer to desired heading $H_D$ over performing a task with work implement 16, the engagement of which with work surface 86 is causing a significant load L on motor grader 10 (i.e., a load L that would cause heading difference $D_H$ to exceed threshold T). Alternatively, if the operator's priority is to perform such a task, the operator could actuate switch 142 to turn off load based tracking assist.

Figure 9:
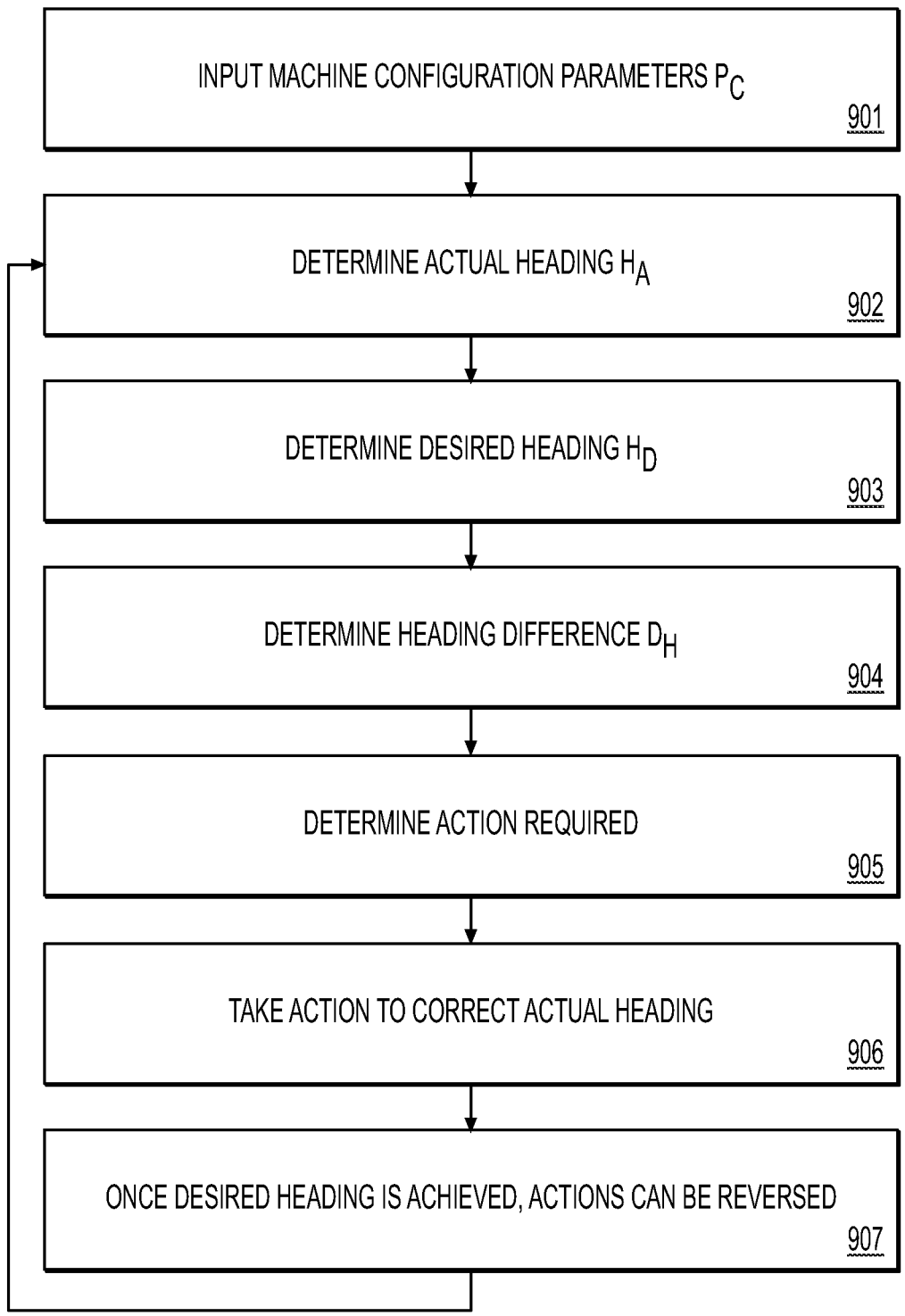
FIG. 9 shows a flow chart of a method for reverting an actual heading of a motor grader to a desired heading according to the present disclosure.

FIG. 9 shows a flow chart of a method for reverting an actual heading $H_A$ of motor grader 10 to a desired heading $H_D$. In step 901, which is optional, configuration parameters $P_C$ are input (e.g., into controller 102). Configuration parameters $P_C$ allow controller 102 to determine whether a corresponding work implement 16 is engaged with work surface 86 such that the particular work implement 16 imparts a load L on motor grader 10. Controller 102 can also use configuration parameters $P_C$ to determine a corresponding load L associated with each work implement 16 with which particular configuration parameters $P_C$ are associated.

In step 902, actual heading $H_A$ is determined (i.e., based on actual rear frame yaw rate $\Delta Y_A$ from rear IMU 130, actual steering angle $\theta_{AS}$, and actual articulation angle $\alpha_A$). In step 903, desired heading $H_D$ is determined (i.e., based on desired steering angle $\theta_{DS}$, desired articulation angle $\alpha_D$, and desired rear frame yaw rate $\Delta Y_D$).

In step 904, a heading difference $D_H$ is determined, which is a difference between actual heading $H_A$ and desired heading $H_D$. For example, controller 102 could determine heading difference $D_H$ by determining differences between actual rear frame yaw rate $\Delta Y_A$ and desired rear frame yaw rate $\Delta Y_D$, actual steering angle $\theta_{AS}$ and desired steering angle $\theta_{DS}$, and actual articulation angle $\alpha_A$ and desired articulation angle $\alpha_D$.

In step 905, if heading difference $D_H$ is significant (i.e., if heading difference $D_H$ exceeds a threshold T) due to a work implement 16 of motor grader 10 engaging a work surface 86, resulting in a significant load L on motor grader 10, a corrective action to decrease heading difference $D_H$ is determined. The corrective action could be any of the following, whether alone or in combination: adjusting steering control 106 to change actual steering angle $\theta_{AS}$; adjusting articulation control 116 to change actual articulation angle $\alpha_A$; performing removal of load L from motor grader 10; providing an indication I to the operator of motor grader 10 to indicate a significant deviation between actual heading $H_A$ and desired heading $H_D$; and lowering actual machine speed $V_A$ until load L is not so significant to cause heading difference $D_H$ to exceed threshold T. The one or more corrective actions are implemented in step 906.

Optionally, in step 907, once actual heading $H_A$ becomes closer to desired heading $H_D$, one or more of the corrective actions taken in step 906 can be reversed, which can result in increasing load L on motor grader 10 once more so that the operator of motor grader 10 can continue the desired task. After step 907, load based tracking assist continues, returning to step 902 to determine actual heading $H_A$ in case of another significant deviation of actual heading $H_A$ from desired heading $H_D$ (i.e., heading difference $D_H$ exceeding threshold T).

INDUSTRIAL APPLICABILITY

In general, the mobile construction equipment, methods, and controllers of the present application are applicable for reverting an actual heading of the mobile construction equipment to a desired heading. The actual heading can deviate from the desired heading if the mobile construction equipment is subjected to significant load. Such loads typically occur when a work implement mounted to the mobile construction equipment engages a work surface on which the mobile construction equipment is operating. If the engagement with the work surface becomes significant (e.g., the work implement hits a large rock), the mobile construction equipment can experience a load that is sufficient to pull the mobile construction equipment of course.

To rectify this situation, the mobile construction equipment, methods, and controllers of the present application contemplate taking one or more corrective actions if the actual heading of the mobile construction equipment significantly deviates from the desired heading. Such corrective actions can include adjusting steering control of the mobile construction equipment; adjusting articulation control of the mobile construction equipment; removing the load, at least in part, from the mobile construction equipment; providing an indication to the operator of the mobile construction equipment that there is a significant deviation between the actual heading and the desired heading; and lowering an actual machine speed of the mobile construction equipment until the load on the mobile construction equipment is not so significant to cause the actual heading to significantly deviate from the desired heading. The present application therefore describes mobile construction equipment, methods, and controllers that improve operation of, for example, motor graders.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The present disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system for reverting an actual heading of a mobile construction equipment subject to load from one or more work implements to a desired heading, the mobile construction equipment having a front frame articulatable with respect to a rear frame, the front frame including a steering apparatus, the system comprising:

a rear inertial motion unit disposed on the rear frame, the rear inertial motion unit being configured to provide an actual rear frame yaw rate;

a steering sensor configured to provide an actual steering angle of the steering apparatus;

an articulation sensor configured to provide an actual articulation angle between the front frame and the rear frame; and a controller configured to:
receive the actual rear frame yaw rate, the actual steering angle, and the actual articulation angle to determine the actual heading,
receive a steering control indicating a desired steering angle of the steering apparatus and an articulation control indicating a desired articulation angle between the front frame and the rear frame,
determine, based on the desired steering angle and the desired articulation angle, a desired rear frame yaw rate,
determine the desired heading based on the desired steering angle, the desired articulation angle, and the desired rear frame yaw rate,
determine a heading difference between the actual heading and the desired heading, and
based on the heading difference exceeding a threshold, at least one of: adjust the steering control, adjust the articulation control, perform removal of load from the mobile construction equipment, or provide an indication to an operator of the mobile construction equipment.

2. The system of claim 1, wherein the heading difference comprises differences between the actual rear frame yaw rate and the desired rear frame yaw rate, the actual steering angle and the desired steering angle, and the actual articulation angle and the desired articulation angle.

3. The system of claim 1, wherein the controller is configured to receive configuration parameters indicating which of the one or more work implements are engaged with a work surface on which the mobile construction equipment is operating, and determine a corresponding load associated with each such work implement.

4. The system of claim 3, wherein the removal of load from the mobile construction equipment comprises:
based on the configuration parameters, at least partial disengagement from the work surface of at least one of the one or more work implements that are engaged with the work surface.

5. The system of claim 4, wherein at least partial disengagement from the work surface of at least one of the one or more work implements that are engaged with the work surface comprises at least partial disengagement from the work surface of a plurality of the one or more work implements that are engaged with the work surface.

6. The system of claim 1, further comprising:
a satellite positioning unit of a global navigation satellite system configured to provide a heading output,
wherein the controller is configured to:
receive the heading output, and
compare the heading output to at least one of the actual heading or the desired heading.

7. The system of claim 6, wherein the controller is configured to modify at least one of the actual heading or the desired heading based on the comparison.

8. A method for reverting an actual heading of a mobile construction equipment subject to load from one or more work implements to a desired heading, the mobile construction equipment having a front frame articulatable with respect to a rear frame, the front frame including a steering apparatus, the method comprising:
receiving an actual rear frame yaw rate from a rear inertial motion unit disposed on the rear frame;
receiving an actual steering angle of the steering apparatus;
receiving an actual articulation angle between the front frame and the rear frame;
determining the actual heading based on the actual rear frame yaw rate, the actual steering angle, and the actual articulation angle;
receiving a steering control indicating a desired steering angle of the steering apparatus;
receiving an articulation control indicating a desired articulation angle between the front frame and the rear frame;
determining, based on the desired steering angle and the desired articulation angle, a desired rear frame yaw rate;
determining the desired heading based on the desired steering angle, the desired articulation angle, and the desired rear frame yaw rate;
determining a heading difference between the actual heading and the desired heading; and
based on the heading difference exceeding a threshold, at least one of: adjusting the steering control, adjusting the articulation control, performing removal of load from the mobile construction equipment, or providing an indication to an operator of the mobile construction equipment.

9. The method of claim 8, wherein the heading difference comprises differences between the actual rear frame yaw rate and the desired rear frame yaw rate, the actual steering angle and the desired steering angle, and the actual articulation angle and the desired articulation angle.

10. The method of claim 8, further comprising:
receiving configuration parameters indicating which of the one or more work implements are engaged with a work surface on which the mobile construction equipment is operating; and
determining a corresponding load associated with each such work implement.

11. The method of claim 10, wherein performing removal of load from the mobile construction equipment comprises:
based on the configuration parameters, at least partially disengaging from the work surface at least one of the one or more work implements that are engaged with the work surface.

12. The method of claim 11, wherein at least partially disengaging from the work surface at least one of the one or more work implements that are engaged with the work surface comprises at least partially disengaging from the work surface a plurality of the one or more work implements that are engaged with the work surface.

13. The method of claim 8, further comprising:
receiving a heading output of a satellite positioning unit of a global navigation satellite system; and
comparing the heading output to at least one of the actual heading or the desired heading.

14. The method of claim 13, further comprising:
modifying at least one of the actual heading or the desired heading based on the comparison.

15. A controller for reverting an actual heading of a mobile construction equipment subject to load from one or more work implements to a desired heading, the mobile construction equipment having a front frame articulatable with respect to a rear frame, the front frame including a steering apparatus, the controller being configured to:

receive an actual rear frame yaw rate from a rear inertial motion unit disposed on the rear frame;

receive an actual steering angle of the steering apparatus;

receive an actual articulation angle between the front frame and the rear frame;

determine the actual heading based on the actual rear frame yaw rate, the actual steering angle, and the actual articulation angle;

receive a steering control indicating a desired steering angle of the steering apparatus;

receive an articulation control indicating a desired articulation angle between the front frame and the rear frame;

determine, based on the desired steering angle and the desired articulation angle, a desired rear frame yaw rate;

determine the desired heading based on the desired steering angle, the desired articulation angle, and the desired rear frame yaw rate;

determine a heading difference between the actual heading and the desired heading; and based on the heading difference exceeding a threshold, at least one of: adjust the steering control, adjust the articulation control, perform removal of load from the mobile construction equipment, or provide an indication to an operator of the mobile construction equipment.

16. The controller of claim 15, wherein the heading difference comprises differences between the actual rear frame yaw rate and the desired rear frame yaw rate, the actual steering angle and the desired steering angle, and the actual articulation angle and the desired articulation angle.

17. The controller of claim 15, wherein the controller is configured to:

receive configuration parameters indicating which of the one or more work implements are engaged with a work surface on which the mobile construction equipment is operating; and determine a corresponding load associated with each such work implement.

18. The controller of claim 17, wherein removal of load from the mobile construction equipment comprises:

based on the configuration parameters, at least partial disengagement from the work surface of at least one of the one or more work implements that are engaged with the work surface.

19. The controller of claim 18, wherein at least partial disengagement from the work surface of at least one of the one or more work implements that are engaged with the work surface comprises at least partial disengagement from the work surface of a plurality of the one or more work implements that are engaged with the work surface.

20. The controller of claim 15, wherein the controller is configured to:

receive a heading output of a satellite positioning unit of a global navigation satellite system;

compare the heading output to at least one of the actual heading or the desired heading; and modify at least one of the actual heading or the desired heading based on the comparison.

* * * * *